June 27, 1933. C. E. SUMMERS ET AL 1,916,085

COUNTERWEIGHT

Filed June 24, 1927

Inventors
Caleb E. Summers &
William H. Manning
By Blackmore, Spencer & Hulse
Attorneys

UNITED STATES PATENT OFFICE

CALEB E. SUMMERS AND WILLIAM H. MANNING, OF PONTIAC, MICHIGAN, ASSIGNORS, BY MESNE ASSIGNMENTS, TO PACKARD MOTOR CAR COMPANY, OF DETROIT, MICHIGAN, A CORPORATION OF MICHIGAN

COUNTERWEIGHT

Application filed June 24, 1927. Serial No. 201,145.

The invention relates to counterweights such as are employed, for example, in counterbalancing engine shafts and the like. The use of counterweights for the counterbalancing of the off-center masses of rotating parts is well understood. In connection with engine shafts, however, a difficulty has been encountered in the use of counterweights due to the torsional vibrations which tend to occur as a result of the energy of the torque impulses. The natural frequency of the shaft when considered as a torsional pendulum varies, of course, with the polar moment of inertia of the off-center masses. The addition of counterweights without otherwise changing the dimensions or rigidity of the shaft will, therefore, lower the natural rate of torsional vibration.

It is important that the natural frequency of the shaft shall not, within any normal speed of the engine, coincide with the frequency of the torque impulses tending to set up torsional vibration, otherwise, at this critical speed, the vibrations may reach such amplitude, due to the occurrence of what may be termed resonance, as to become very undesirable and even dangerous. Hence the use of counterweights has hitherto been restricted to the employment of masses which, when added to the shaft, would not bring the fundamental or natural torsional frequency into synchronism with the torque impulses within the normal speed range.

In accordance with the present invention it is proposed to so mount the counterweights upon the device to be counterbalanced that, at the lower speeds, the counterweight does not become a rigid part of the shaft and, therefore, does not contribute materially to the lowering of the natural or inherent torsional frequency. The counterweight is also so supported and connected to the shaft that it will exert a damping influence upon torsional vibrations occurring at lower speeds than that corresponding to the fundamental frequency. Preferably the mounting is also such that, as the critical speed is approached, the counterweight becomes more or less rigidly connected to the shaft, thereby immediately changing the natural frequency automatically to a value which, when the parts are properly proportioned, is well below that which would be in synchronism with the torque impulses at the then existing speed.

In the accompanying drawing showing an embodiment of the invention Fig. 1 is a side elevation of a crank shaft illustrating the application to a crank shaft of counterweights embodying the invention.

Figure 1:
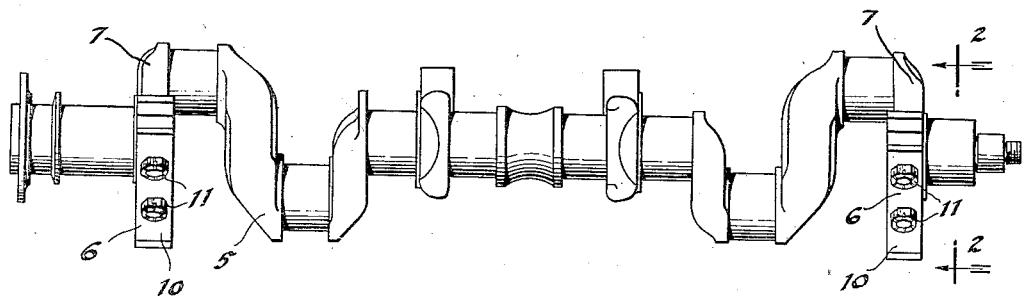
Figure 2:
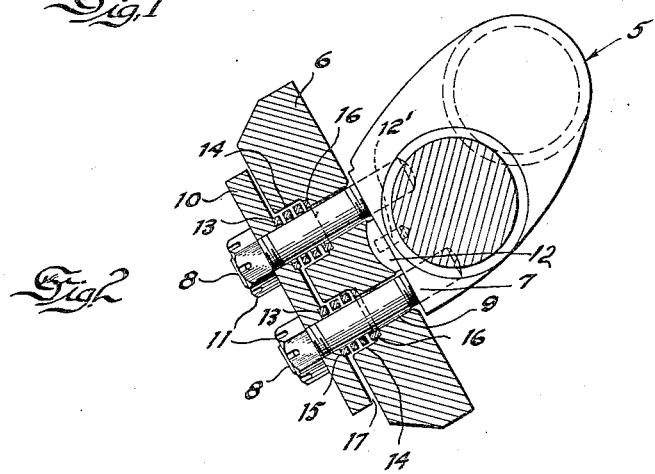
Fig. 2 is a partial section on line 2—2 of Fig. 1.

Referring to the drawing, 5 indicates a crank shaft of a type commonly employed in six cylinder internal combustion engines, the shaft illustrated having four journals and two throws or crank pins between each pair of journals. Counterweights 6 are shown positioned on four of the cheeks 7 of the shaft. As the invention is in no way concerned with the specific type of shaft or the arrangement of crank throws or distribution of counterweights, we have shown merely a conventional shaft and arrangement of counterweights, in order to illustrate the attachment of the weights to the cheeks or webs of a crank shaft, it being understood, of course, that the disposition of the weights and their number will vary in accordance with the type of shaft and the particular system of counterbalancing employed.

The counterweight 6, as illustrated, is attached to the web 7 by means of stud bolts 8 engaging in threaded apertures in the web and passing through holes 9 in the weight. These bolts also extend through holes in a plate 10, positioned outside the weight, and are threaded at their outer ends to receive nuts 11. The weight 6 is seated upon the cylindrical face of a rocker plate 12 which may be doweled to the outer end of the web 7 as at 12', the interengaging faces of the weight 6 and the plate 12 being such that the weight may oscillate freely relatively to the plate about the center of curvature of the latter. In order to permit such oscillation the holes 9 are of somewhat greater diameter than the bolts 8 so that there is a clearance space between the bolts and the weight. Also the weight is spaced slightly away from the adjacent faces of the web 7 and of the plate 10.

Springs 13 seated in recesses 14 in the counterweight exert pressure between the plate 10 and weight 6 tending to force the weight against its seat on the rocker block 12. These springs do not normally engage with the bolts 8 nor with the wall of recess 14 but are fitted at their outer ends into recesses 15 in the plate 10 and at their inner ends into recesses 16 in the weight. It will be seen, therefore, that the weight is mounted to oscillate or swing in a plane normal to the axis of the shaft, being restrained only by the resilient connection to the plate 10 through springs 13.

The strength or adjustment of the springs 13 and the distance between the bolts 8 should be so selected, relative to the mass of the counterweight, that the natural frequency of oscillation of the weight will be substantially the same as the natural frequency of torsional vibration of the shaft assembly as a whole. Under these circumstances the counterweight will act as a damper for the torsional vibrations occurring at certain speeds below that at which the torque impulses are synchronous with the torsional vibrations of the shaft assembly, since the oscillations of the weight will be out of phase will those of the shaft assembly.

With the arrangement and operation thus far described it will be understood that the counterweights mounted upon the shaft, since they are non-rigidly connected to the shaft, do not affect materially the mass of the shaft assembly determining the natural torsional frequency thereof. In other words, they do not tend to reduce materially the fundamental or inherent rate of torsional vibration. When the design of the shaft assembly is such, however, that at some point within the possible operating speed the torque impulses synchronize with the torsional frequency, the resonance occurring due to the coincidence of torque impulses with the successive torsional cycles causes vibrations which cannot be effectively damped by balancing devices designed for the lower speeds. To meet this difficulty the counterweight mechanism is so constructed that, as the shaft approaches the critical speed corresponding to the natural torsional frequency of the shaft, the weights assume a more or less rigid connection with the shaft, thereby effecting a change in the natural frequency of the shaft assembly.

This result is accomplished by so proportioning the space 17 between the weight 6 and the plate 10 relative to the mass of the weight and the strength of the springs 13 that, as the critical speed is approached, the centrifugal force acting on the weight will be sufficient to overcome the resistance of the springs and cause the weight to seat against the plate 10. The weight thereupon ceases to be a "floating" weight and becomes temporarily a more or less rigid part of the shaft assembly.

If it be assumed, for example, that the fundamental torsional frequency of the uncounterweighted shaft occurs at a speed of 2300 r. p. m., and the natural torsional frequency of the shaft, with the addition of rigidly connected counterweights, occurs at a speed of 1900 r. p. m., then the parts may be so designed that at a speed between the two, say of approximately 2100 r. p. m., the counterweights will engage with the abutment plates 10. Since the effect of the counterweights, when engaged, is to lower the fundamental torsional frequency below that of the torque impulses at the then existing speed it will be obvious that resonance can no longer occur at the higher speed of 2300 r. p. m. Torsional vibration at the fundamental frequency of the shaft, either with or without the counterweights, is therefore eliminated.

Figure 3:
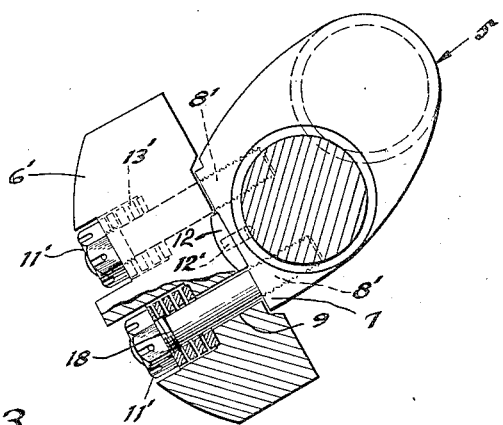
Fig. 3 is a view similar to Fig. 2 but showing a slight modification.

The form shown in Fig. 3 differs from that previously described in utilizing the springs as the means for providing a relatively rigid connection between the weight and the shaft. As illustrated in this figure, the weight 6' is restrained from outward movement at lower speeds by the springs 13' which are seated at their outer ends on the nuts 11'. Each bolt 8' is provided at its outer end with a shoulder or annular enlargement 18 adapted to fit closely the interior of the spring 13'.

The operation will be the same as in the form already described up to a speed above that at which the fundamental torsional period would occur if the counterweights were rigidly attached to the shaft but below that corresponding to the fundamental of the shaft with floating or non-rigidly attached weights. Then, as the speed increases, the springs become compressed to such an extent that the successive coils contact with each other and provide a connection sufficiently rigid to effect the lowering of the natural frequency below that which would synchronize with the torque impulses at the then existing speed.

While we have shown all of the counterweights as being of the floating or oscillatory type, the purpose of them may be effected in some cases by the use of one or more counterweights of the floating type, the remainder being rigidly connected to the shaft. For the damping of torsional vibrations, the location of the damper adjacent the front end of the shaft (i. e., the end at the front of the automobile, or remote from the driving end or flywheel end) is more effective. If some of the counterweights are rigid, therefore, it is preferable to locate the floating counterweights on the front portion of the shaft. For example, in the form shown, the one counterweight at the front end, or the front two, or the front three, may be of the floating type.

Various other modifications may be made by one skilled in the art without departing from the spirit and scope of the invention and, therefore, we do not wish to be restricted to the specific details herein set forth except as required by the language of the claims in view of the prior art.

We claim:

1. The combination with a crankshaft assembly having a natural fundamental torsional period at a certain speed of rotation, of a weight mounted upon said shaft assembly, a support for said weight permitting the weight to oscillate in a plane normal to the axis of the shaft at speeds below said certain speed, means for elastically connecting said shaft and said weight to resist oscillation of said weight, and means whereby upon the approach to said certain speed said weight is rendered incapable of oscillating.

2. The combination with a crankshaft subject to torsional vibrations, of a balancer for the torsional vibrations, comprising an oscillatory counterweight for said shaft, a support for said weight, and means whereby said weight will be connected substantially rigidly to the shaft above a predetermined speed of rotation of the shaft.

3. The combination with a crankshaft subject to torsional vibrations of a balancer therefor, comprising a weight mounted on the shaft to oscillate in a plane normal to the axis of the shaft, means for elastically connecting said shaft and said weight to resist oscillation of said weight, the weight and elastic means being so proportioned as to cause said oscillations to damp the torsional vibrations of the shaft, and means whereby said weight will be connected substantially rigidly to the shaft at a predetermined speed of rotation of the shaft.

4. The combination with a crankshaft of balancing means therefor comprising a weight mounted to oscillate relatively to said shaft, spring means arranged to restrain said oscillations and to be placed under compression by action of centrifugal force on said weight, and means for connecting said weight substantially rigidly to said shaft when said springs are compressed to a predetermined extent.

5. The combination with a rotating body subject to torsional vibrations of damping means for said vibrations comprising a weight yieldably mounted to oscillate relatively to said body and to move outwardly from the axis thereof under the influence of centrifugal force, spring means restraining such outward movement and means operative upon a predetermined outward movement of said weight for connecting the same substantially rigidly to said body.

6. The combination with a rotating body of a weight connected to said body to oscillate relatively thereto and movable outwardly from the axis thereof under the influence of centrifugal force, spring means for restraining such outward movement, and means for connecting said weight to said body substantially rigidly upon a predetermined outward movement thereof.

7. The combination with a rotary shaft subject to torsional vibrations and having a fundamental torsional period at a certain speed of rotation, of a weight movably mounted on said shaft, means adapted to be engaged by said weight to rigidly connect the weight to the shaft, and resilient means opposing movement of said weight to engaging position and yieldable as said certain speed is approached to permit said rigid connection.

8. The combination with a crankshaft of a counterweight therefor mounted on the shaft for pivotal and lateral movement in its plane of rotation, a resilient connection adapted to oppose said movements to damp out the torsional vibration at the lower shaft speeds, and means limiting said lateral movement at a predetermined higher speed to engage the weight rigidly with the shaft.

9. The combination with a crankshaft subject to torsional vibrations, of an inertia mass, means for supporting said mass on said shaft for bodily movement in response to centrifugal force and for oscillatory movement in response to torsional vibrations, resilient means for resisting both movements, and means carried by the shaft and arranged to be engaged by said mass on bodily movement of the latter for preventing oscillatory movement thereof when a predetermined rotational speed of the shaft is reached.

In testimony whereof we affix our signatures.

CALEB E. SUMMERS.
W. H. MANNING.